United States Patent
Tai

(10) Patent No.: US 7,031,609 B2
(45) Date of Patent: Apr. 18, 2006

(54) OPTICAL ADD-DROP MULTIPLEXER

(75) Inventor: Shu Lin Tai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 708 days.

(21) Appl. No.: 09/982,363

(22) Filed: Oct. 17, 2001

(65) Prior Publication Data

US 2003/0025967 A1    Feb. 6, 2003

(30) Foreign Application Priority Data

Aug. 3, 2001    (TW)    ............... 90119096 A

(51) Int. Cl.
 *H04J 14/02*    (2006.01)

(52) U.S. Cl. ............... 398/83; 398/85; 398/87; 398/88

(58) Field of Classification Search ............... 398/83, 398/85, 87, 96, 88
See application file for complete search history.

(56) References Cited

U.S. PATENT DOCUMENTS

| | | | |
|---|---|---|---|
| 6,249,625 B1 * | 6/2001 | Pan ............................. | 385/43 |
| 6,477,289 B1 * | 11/2002 | Li ............................... | 385/16 |
| 6,792,210 B1 * | 9/2004 | Hallock et al. ............... | 398/83 |
| 6,792,211 B1 * | 9/2004 | Chang et al. ................. | 398/85 |
| 6,804,432 B1 * | 10/2004 | Tai .............................. | 385/24 |
| 2002/0171931 A1 * | 11/2002 | McLeod et al. ............. | 359/484 |

* cited by examiner

*Primary Examiner*—Kenneth Vanderpuye
*Assistant Examiner*—Dzung Tran
(74) *Attorney, Agent, or Firm*—Wei Te Chung

(57) ABSTRACT

An optical add-drop multiplexer successively comprises a first ferrule, a first graded index (GRIN) lens with a bandpass filter attached thereon, an optical crystal, a second GRIN lens, and a second ferrule. An input and an output optical fiber are stationed in the first ferrule, and a dropping and an adding optical fiber are stationed in the second ferrule. An optical multiplexed signal from the input optical fiber is transmitted through the first GRIN lens to the bandpass filter. From the bandpass filter, an optical signal having a wavelength identical to a central wavelength of the bandpass filter is output to the dropping optical fiber, and other optical signals having other wavelengths are coupled with an optical signal from the adding optical fiber having a wavelength identical to the central wavelength of the bandpass filter and are transmitted to the output optical fiber.

8 Claims, 8 Drawing Sheets

US 7,031,609 B2

OPTICAL ADD-DROP MULTIPLEXER

BACKGROUND OF THE INVENTION

1. Field of the Invention

The present invention relates to optical fiber communications, and particularly to optical add-drop multiplexers comprising a bandpass filter and installed in an optical dense wavelength-division multiplexer (DWDM) communications network for dropping an optical signal having a particular wavelength from an optical wavelength-division multiplexed signal and simultaneously complementing the optical wavelength-division multiplexed signal by adding an optical signal having a wavelength that is identical to the particular wavelength of the dropped optical signal.

2. Description of Prior Art

An optical DWDM communications network based on an optical wavelength-division multiplexed signal is widely used in large-scale communications networks. In order to set up a complete optical communications network based on optical DWDM technology, optical add-drop multiplexers should be adopted to drop and add optical signals having particular wavelengths and thereby exchange information. A variety of optical add-drop multiplexers have been developed.

FIG. 1 shows an optical add-drop multiplexer 70, as disclosed in U.S. Pat. No. 6,101,012. The optical add-drop multiplexer 70 comprises an input optical fiber $L_2$ and an output optical fiber $L_3$ which are connected with a network. An optical multiplexed signal B from the input optical fiber $L_2$ is transmitted into an input end 711 of a DWDM 71, and demultiplexed into optical signals $B_1, B_2, \ldots, B_L$ respectively comprising different wavelengths. Then, the optical signals $B_1, B_2, \ldots, B_L$ are transmitted to corresponding output ends 712, 713, ..., 714 of the DWDM 71. $B_1$ is transmitted into one input end of a 2×2 optical exchange device 72, via an optical fiber $L_{13}$. The other input end of the optical exchange device 72 is connected with an optical fiber $L_5$ comprising an added optical signal $A_1$. Two output ends of the optical exchange device 72 are respectively connected with an optical fiber $L_{15}$ which is used to transmit optical signals, and an optical fiber $L_6$ which comprises a dropped optical signal $D_1$. $B_1$ is changed into $C_1$ by the optical exchange device 72. In this process, an optical signal $D_1$ having a particular wavelength is dropped from $C_1$, and an optical signal $A_1$ having the same wavelength as $D_1$ is added to $C_1$. $C_1$ is transmitted into an input end 732 of a DWDM 73. In the same way, $B_2, \ldots, B_L$ are respectively changed into $C_2, \ldots, C_L$, and transmitted into corresponding input ends 733, ..., 734. Then, $C_1, C_2, \ldots, C_L$ are multiplexed into C, and C is transmitted to an output optical fiber $L_3$ via an output end 731. The optical add-drop multiplexer 70 further comprises a converter 74, a controller 75, a modulator 76, an attenuator 77, and a converter 78.

The above-described optical add-drop multiplexer 70 has several drawbacks. For example, interference between signals is easily produced, because an input optical multiplexed signal needs to be demultiplexed. Then optical signals having particular wavelengths need to be added and dropped by the optical exchange devices, and multiplexed with the demultiplexed optical signals.

In addition, the DWDMs 71 and 73 comprise many optical devices. Therefore the DWDMs 71 and 73 occupy too much space, are unduly heavy, and are costly. Furthermore, a plurality of long optical fibers $L_5, L_6, L_{13}, L_{15}, L_{17}, \ldots, L_{23}$ are placed in the optical add-drop multiplexer 70. Thus the optical fibers $L_5, L_6, L_{13}, L_{15}, L_{17}, \ldots, L_{23}$ are easily pulled apart or connected in error, resulting in high insertion loss in each joint.

FIG. 2 shows another conventional optical add-drop multiplexer 90, as disclosed in U.S. Pat. No. 5,822,095. The optical add-drop multiplexer 90 comprises a first circulator 93, a bandpass filter 94 and a second circulator 98. The bandpass filter 94 has a central wavelength $\lambda_1$ that passes an optical signal having a wavelength $\lambda_1$, but reflects optical signals having other wavelengths.

In use, an input optical multiplexed signal from an optical fiber 91 is transmitted from a node 931 to a node 932 of the first circulator 93, then transmitted to the bandpass filter 94 via an optical fiber 95. An optical signal having a wavelength identical to the central wavelength $\lambda_1$ of the bandpass filter 94 is passed through the bandpass filter 94 and transmitted to a node 981 of the second circulator 98 via an optical fiber 99. Then the optical signal having wavelength $\lambda_1$ is dropped to an optical fiber 96 via a node 982. Other optical signals having other wavelengths are returned to the first circulator 93 by the bandpass filter 94, and output to an optical fiber 92 via a node 933. An added optical signal having wavelength $\lambda_1$ from an optical fiber 97 is transmitted from a node 983 to a node 981 of the second circular 98. That added optical signal is then transmitted to the first circular 93 via the bandpass filter 94, and output to the optical fiber 92 via the node 933.

The above described optical add-drop multiplexer only deals with the optical signals having the wavelength to be added or dropped. Thus, interference between signals can be reduced. However, in practice, a plurality of optical add-drop multiplexers 90 needs to be connected in series to add or drop multicenter optical signals. An optical add-drop multiplexer module comprising a plurality of optical add-drop multiplexers 90 occupies considerable space. In addition, the circulators 93, 98 each comprise at least two optical devices. The overall result is high costs. Furthermore, a multitude of optical fibers 91, 92, 95, 96, 97 and 99 needs to be adopted during the assembling process. The optical fibers 91, 92, 95, 96, 97 and 99 are difficult to identify, and are easily pulled apart or connected in error. Moreover, the resulting multitude of joints increases insertion loss.

SUMMARY OF THE INVENTION

In view of the above, an object of the present invention is to provide an improved optical add-drop multiplexer which occupies minimal space, and which is simple, easy to manufacture and inexpensive.

Another object of the present invention is to provide an improved optical add-drop multiplexer that can add and drop multicenter optical signals.

In order to achieve the objects set out above, an optical add-drop multiplexer in accordance with the present invention successively comprises a first ferrule, a first graded index (GRIN) lens with a bandpass filter attached thereon, an optical crystal, a second GRIN lens and a second ferrule. An input and an output optical fiber are stationed in the first ferrule, and a dropping and an adding optical fiber are stationed in the second ferrule. Positions of all components are adjusted relative to each other. An optical multiplexed signal from the input optical fiber is transmitted through the first GRIN lens to the bandpass filter. From the bandpass filter, an optical signal having a wavelength identical to a central wavelength of the bandpass filter is output to the dropping optical fiber, and other optical signals having other wavelengths are coupled with an optical signal from the adding optical fiber having a wavelength identical to the central wavelength of the bandpass filter and are transmitted to the output optical fiber.

Several optical add-drop multiplexers each having different central wavelengths are connected in series to form a multicenter optical add-drop multiplexer module. An input optical fiber of the first optical add-drop multiplexer serves as an input end for optical signals, an output optical fiber of the last optical add-drop multiplexer serves as an output end for optical signals, and an output optical fiber of each optical add-drop multiplexer connects with an input optical fiber of its adjacent optical add-drop multiplexer.

Other objects, advantages and novel features of the invention will become more apparent from the following detailed description when taken in conjunction with the accompanying drawings, in which:

DETAILED DESCRIPTION OF PREFERRED EMBODIMENTS OF THE INVENTION

Reference will now be made to the drawings to describe the present invention in detail.

Figure 1:
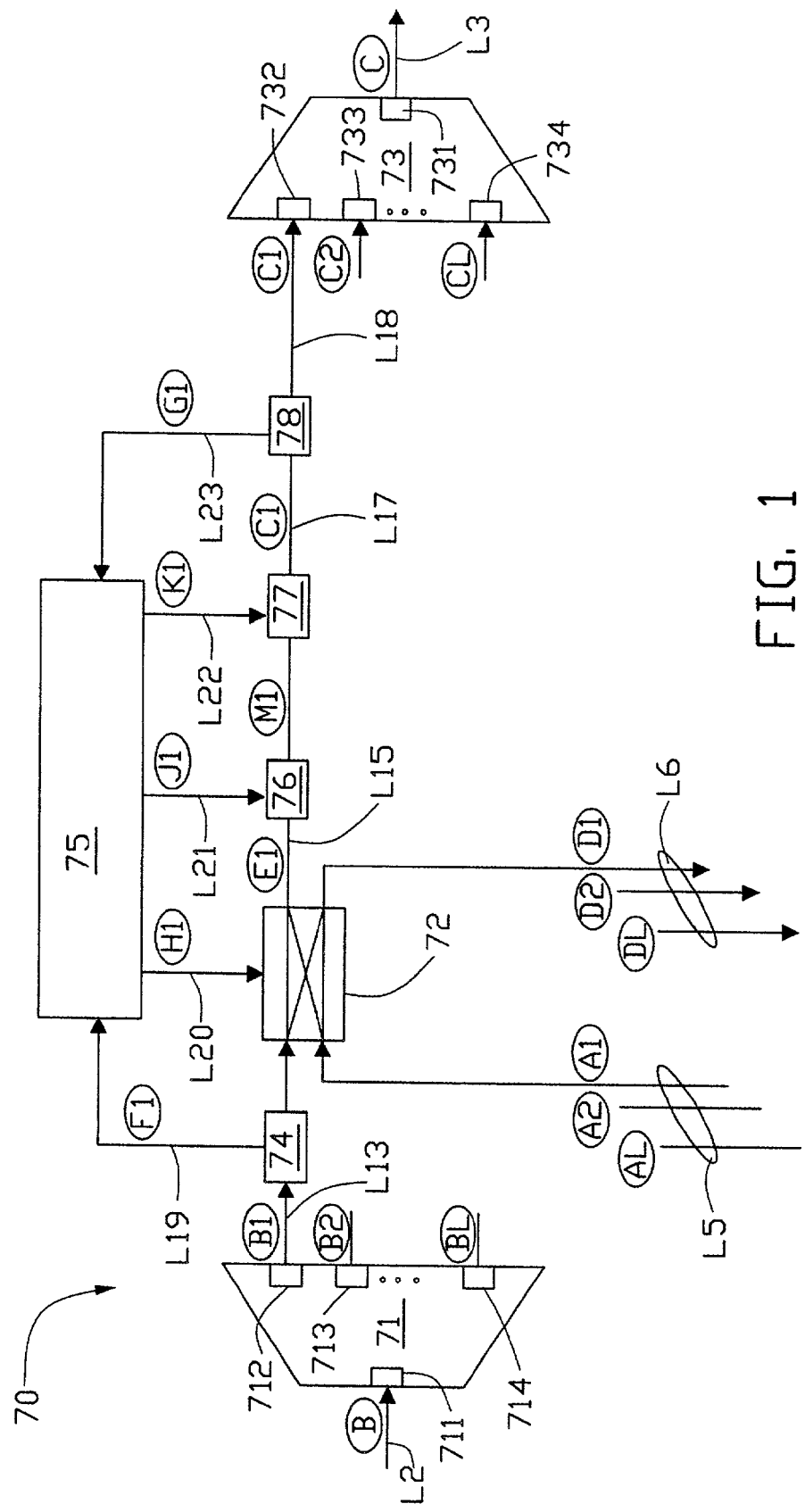
FIG. 1 is a perspective view of a conventional optical add-drop multiplexer.
Figure 2:
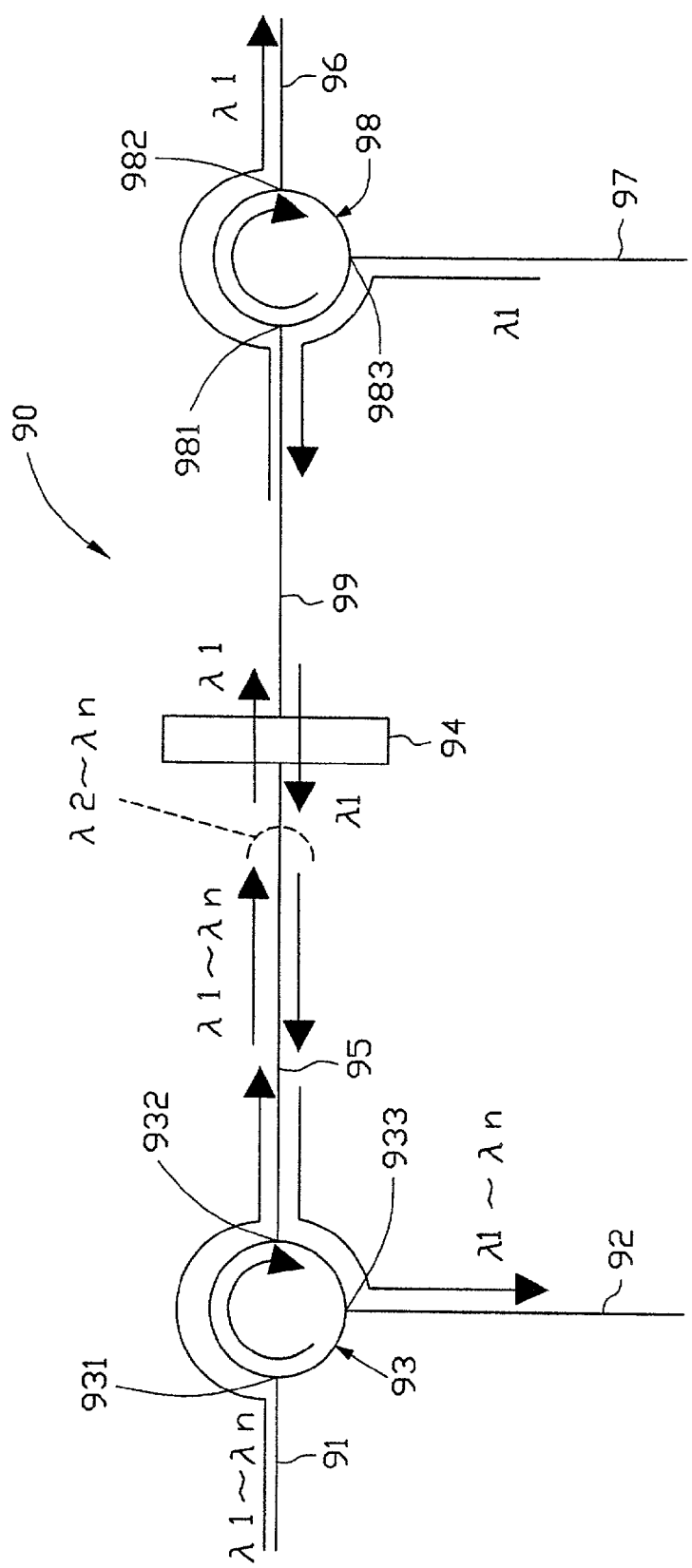
FIG. 2 is a perspective view of another conventional optical add-drop multiplexer.
Figure 3A:
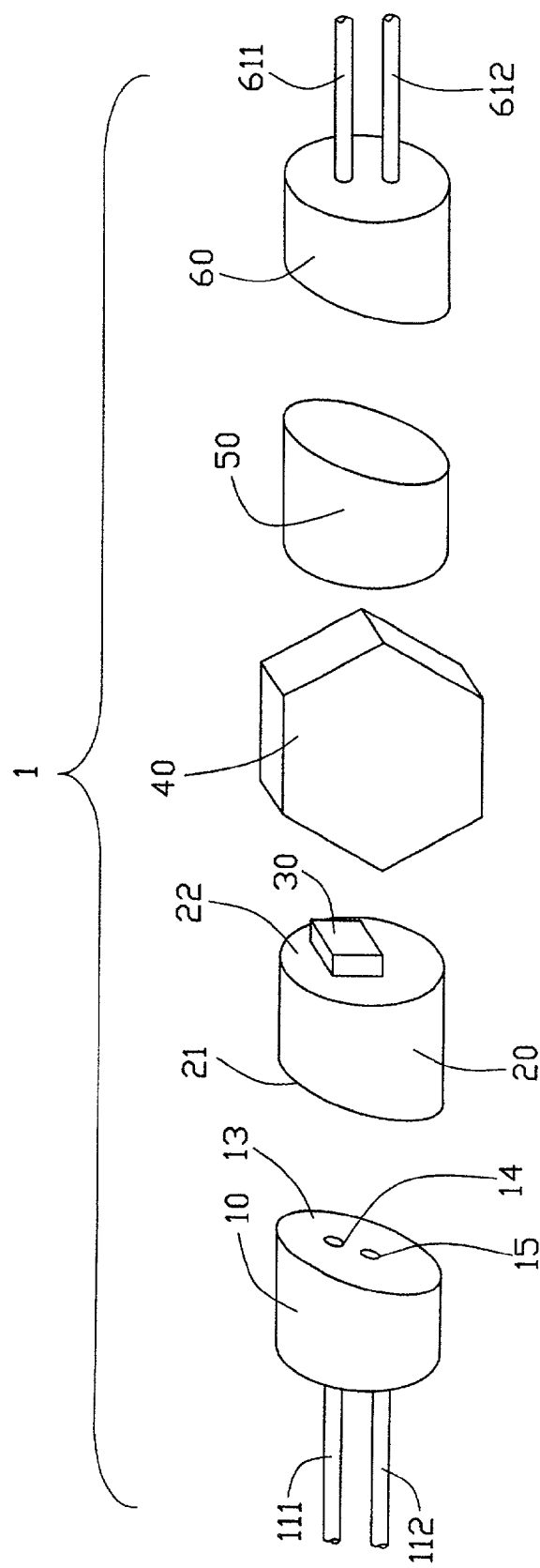
FIG. 3A is an exploded view of an optical add-drop multiplexer in accordance with a first embodiment of the present invention.

FIG. 3A shows an optical add-drop multiplexer 1 in accordance with a first embodiment of the present invention. The optical add-drop multiplexer 1 comprises a first ferrule 10, a first graded index (GRIN) lens 20, a bandpass filter 30, an optical crystal 40, a second GRIN lens 50, and a second ferrule 60.

The first ferrule 10 comprises an end 13, and defines two holes 14, 15. An inmost surface of the end 13 is oriented at an angle of 6°~8° relative to a longitudinal axis of the first ferrule 10. An antireflection film is coated onto that inmost surface. The holes 14, 15 respectively hold an input optical fiber 111 and an output optical fiber 112 therein. An inmost end surface of each optical fiber 111, 112 is coplanar with the inmost surface of the end 13.

The first GRIN lens 20 comprises two opposite ends 21, 22. A slanted surface of the end 21 is near and parallel to the inmost surface of the end 13 of the first ferrule 10. The bandpass filter 30 is attached on a flat surface of the end 22. The bandpass filter 30 can be a thin film filter having a particular central wavelength $\lambda_1$. Positions of the first ferrule 10, the first GRIN lens 20 and the bandpass filter 30 are adjusted relative to each other. Therefore, an optical multiplexed signal from the input optical fiber 111 can be transmitted to the bandpass filter 30 via the first GRIN lens 20, and the optical multiplexer signal reflected by the bandpass filter 30 can be transmitted to the output optical fiber 112.

The optical crystal 40 is made of glass or other suitable material. A profile of the optical crystal 40 can be a regular hexagon or other suitable shape. The optical crystal 40 refracts the optical signal passed therethrough to change a direction of transmission of a light beam of that optical signal.

Figure 3B:
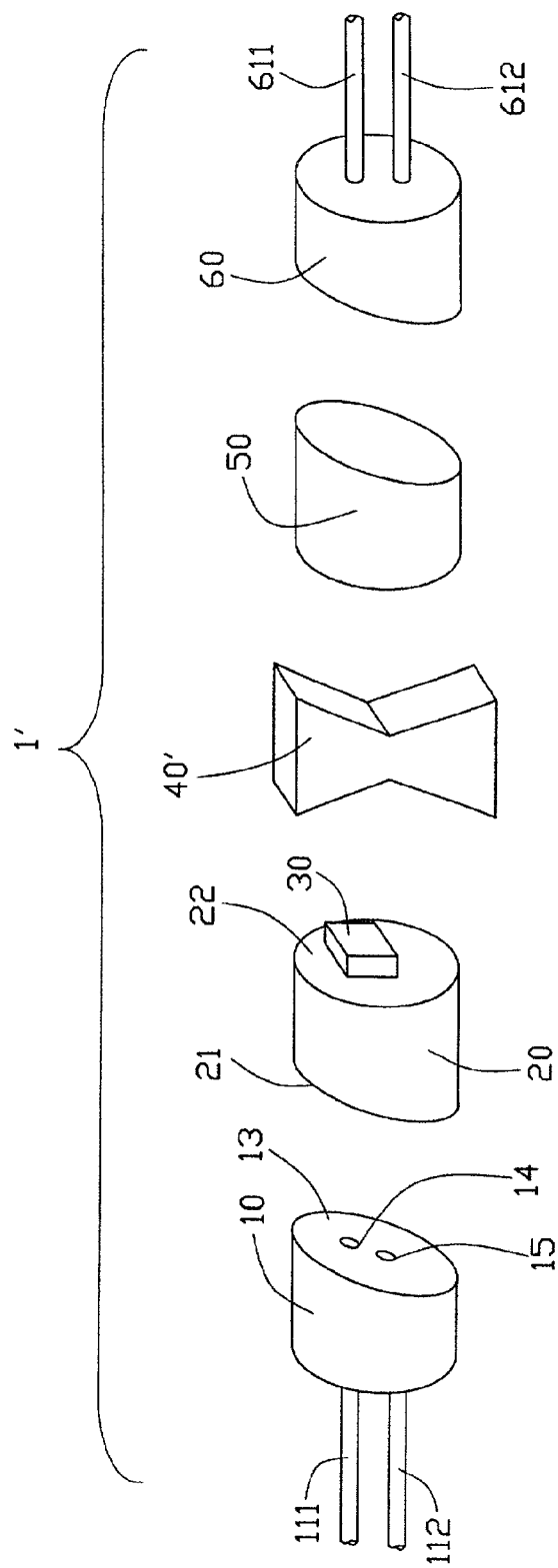
FIG. 3B is an exploded view of an optical add-drop multiplexer in accordance with a second embodiment of the present invention.

FIG. 3B shows an optical add-drop multiplexer 1' in accordance with a second embodiment of the present invention. A profile of an optical crystal 40' of the optical add-drop multiplexer 1' is an egg-timer shaped hexagon. In an alternative embodiment, a profile of the optical crystal 40' can be another suitable shape that has the same effect as the egg-timer shaped hexagon.

The second GRIN lens 50 is the same as the first GRIN lens 20, and the second ferrule 60 is the same as the first ferrule 10. Two optical fibers 611, 612 are accommodated in the second ferrule 60, and respectively act as an adding end and a dropping end for an optical signal having a particular wavelength.

Figure 4:
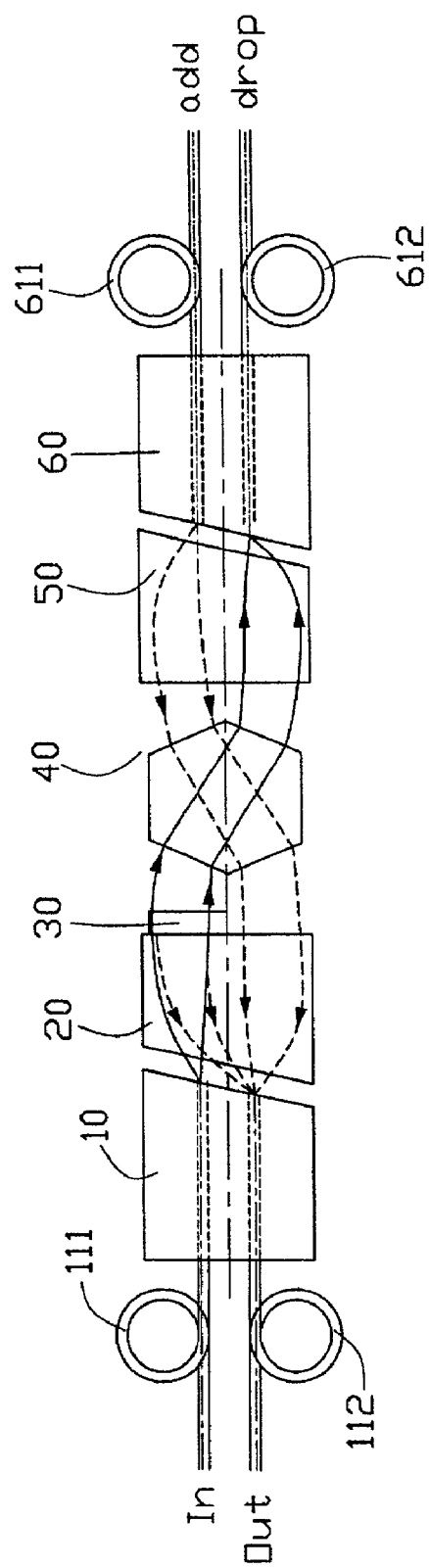
FIG. 4 is a light path diagram explaining the optical add-drop multiplexer in accordance with the first embodiment of the present invention.

FIG. 4 is a light path diagram explaining the optical add-drop multiplexer 1 in accordance with the first embodiment of the present invention. In use, an optical multiplexed signal from the input optical fiber 111 is transmitted to the bandpass filter 30 via the first GRIN lens 20. An optical signal of the optical multiplexed signal having a wavelength identical to the central wavelength $\lambda_1$ of the bandpass filter 30 is passed through the bandpass filter 30 and transmitted to the optical crystal 40. The optical crystal 40 refracts a direction of transmission of the optical signal having the wavelength $\lambda_1$, and transmits that optical signal to the dropping optical fiber 612 via the second GRIN lens 50 to complement a dropping process of the particular wavelength $\lambda_1$. Other optical signals having other wavelengths are reflected by the bandpass filter 30 and collimated to the output optical fiber 112 by the first GRIN lens 20. An optical signal having the particular wavelength $\lambda_1$ from the adding optical fiber 611 is transmitted to the optical crystal 40 via the second GRIN lens 50. A direction of transmission of the optical signal is refracted by the optical crystal 40. Then that optical signal is transmitted to the output end 112 via the first GRIN lens 20 to complement an adding process of the particular wavelength $\lambda_1$.

Figure 5:
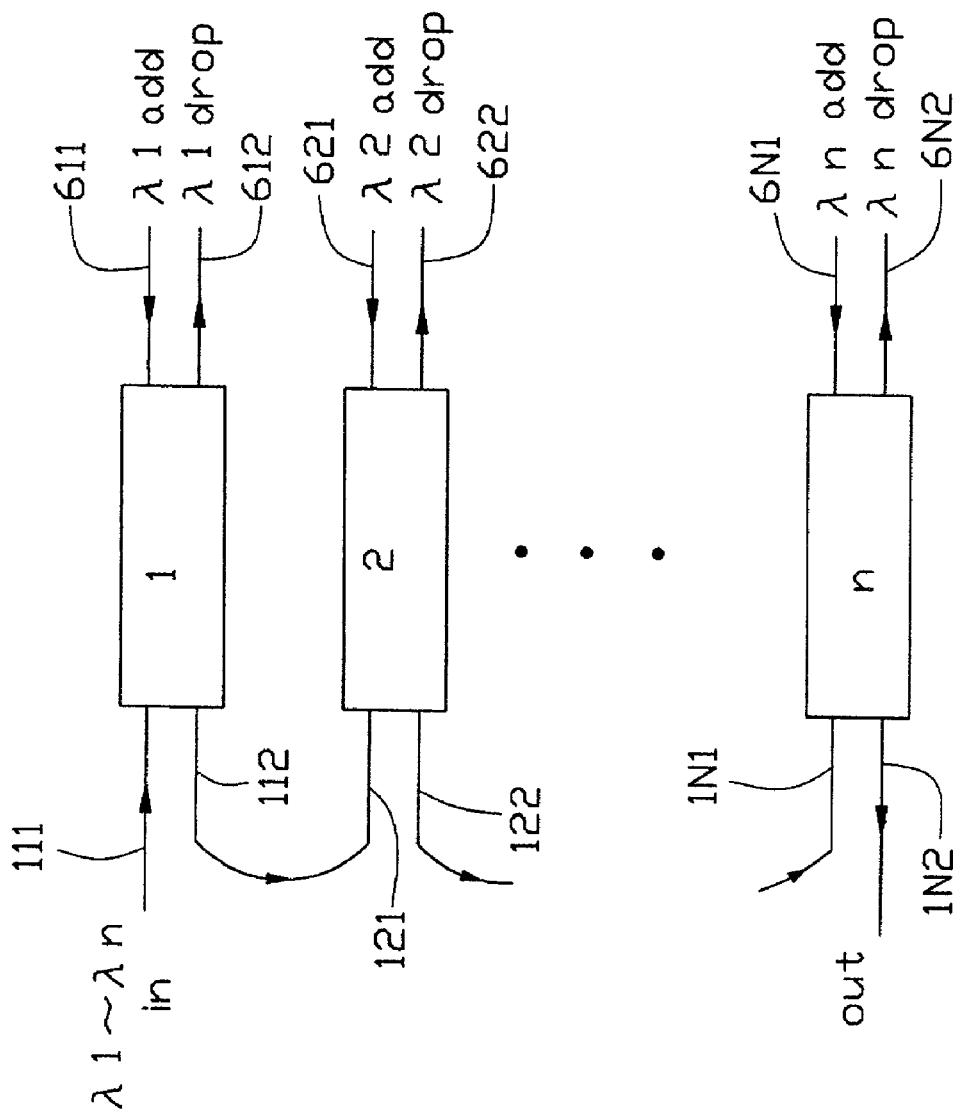
FIG. 5 is a diagram showing several optical add-drop multiplexers of the first embodiment connected in series.

FIG 5 is a diagram showing several optical add-drop multiplexers 1 of the first embodiment connected in series. N optical add-drop multiplexers 1 as shown in FIG. 3A are connected in series to provide complementary adding and dropping processes of 1~N channels of optical signals. Each optical add-drop multiplexer 1 has a different central wavelength $\lambda_1$~$\lambda_n$.

In use, the input optical fiber 111 of the first optical add-drop multiplexer and an output optical fiber 1N2 of an Nth optical add-drop multiplexer respectively act as an input end and an output end for optical signals. An output end 112~1(N−1)2 of each optical add-drop multiplexer connects with an input end 121~1N1 of its adjacent optical add-drop multiplexer. Adding ends 611~6N1 and dropping ends 612~6N2 for particular wavelengths respectively add and drop $\lambda_1$~$\lambda_n$ of the optical multiplexed signal.

Figure 6:
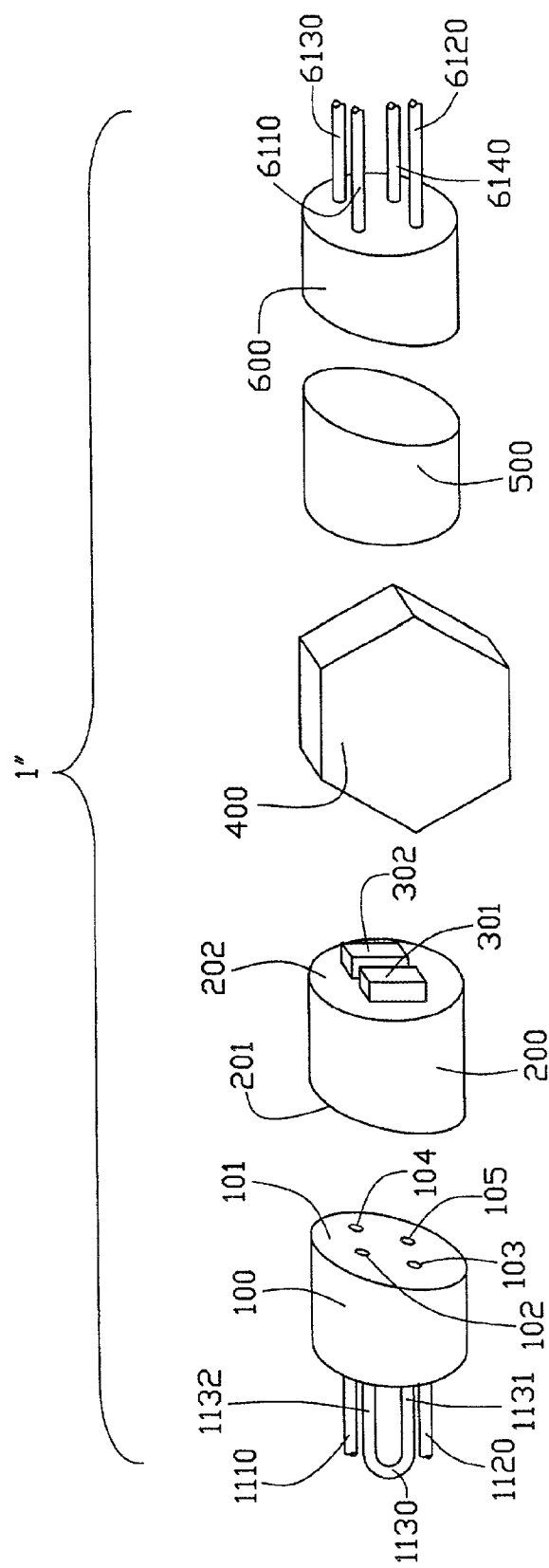
FIG. 6 is an exploded view of an optical add-drop multiplexer in accordance with a third embodiment of the present invention.

FIG. 6 shows an optical add-drop multiplexer 1" in accordance with a third embodiment of the present invention. The optical add-drop multiplexer 1" comprises a first ferrule 100, a first GRIN lens 200, two bandpass filters 301, 302, an optical crystal 400, a second GRIN lens 500, and a second ferrule 600.

The first ferrule 100 comprises an end 101, and defines four holes 102, 103, 104, 105. An inmost surface of the end 101 is oriented at an angle of 6°~8° relative to a longitudinal axis of the first ferrule 100. An antireflection film is coated onto that inmost surface. The holes 102, 105, 103, 104, respectively hold one end of an input optical fiber 1110, one end of an output optical fiber 1120, and two ends 1131, 1132 of a third optical fiber 1130 therein. Inmost end surfaces of the optical fibers 1110, 1120, 1130 are coplanar with the inmost surface of the end 101.

The first GRIN lens 200 comprises two opposite ends 201, 202. A slanted surface of the end 201 is near and parallel to the inmost surface of the end 101 of the first ferrule 100. That slanted surface is oriented at an angle of 6°~8° relative to a longitudinal axis of the first GRIN lens 200. An antireflection film is coated onto that slanted surface. The bandpass filters 301, 302 are attached on a flat surface of the end 202. The bandpass filters 301, 302 can be thin film filters having different central wavelengths $\lambda_1$, $\lambda_2$.

Positions of the first ferrule 100, the first GRIN lens 200 and the bandpass filters 301, 302 are adjusted relative to each other. Therefore, an optical multiplexed signal from the input optical fiber 1110 is transmitted to the bandpass filter 301 via the first GRIN lens 200, and optical signals reflected by the bandpass filter 301 are collimated to the end 1131 of the third optical fiber 1130. Then the optical signals are transmitted to the first GRIN lens 200 via the end 1132 of the third optical fiber 1130, and collimated to the bandpass filter 302. The optical multiplexer signals are reflected by the bandpass filter 302 and collimated to the output optical fiber 1120.

The second ferrule 600 has four optical fibers 6110, 6120, 6130, 6140 stationed therein. The optical fibers 6110, 6130 respectively act as a first and a second adding optical fiber for respectively adding wavelengths $\lambda_1$, $\lambda_2$ of the optical multiplexed signal. The optical fibers 6120, 6140 respectively act as a first and a second dropping optical fiber for respectively dropping wavelengths $\lambda_1$, $\lambda_2$ of the optical multiplexed signal.

In use, the optical multiplexed signal from the input optical fiber 1110 is transmitted to the bandpass filter 301 via the first GRIN lens 200. An optical signal having a wavelength identical to the central wavelength $\lambda_1$ the bandpass filter 301 is passed through the bandpass filter 301 and transmitted to the optical crystal 400. Then a direction of transmission of the optical signal is refracted by the optical crystal 400, and the optical signal is focused to the first dropping optical fiber 6120 by the second GRIN lens 500. Other optical signals having other wavelengths are reflected by the bandpass filter 301 and focused to the end 1131 of the third optical fiber 1130. Then those other optical signals are input from the other end 1132 of the third optical fiber 1130, and transmitted to the bandpass filter 302 via the first GRIN lens 200. Then, an optical signal having a wavelength identical to the central wavelength $\lambda_2$ of the bandpass filter 302 is passed through the bandpass filter 302 and transmitted to the optical crystal 400. Then a direction of transmission of the optical signal is refracted by the optical crystal 400, and the optical signal is focused to the second dropping optical fiber 6140 by the second GRIN lens 500. Thus a function of dropping the two particular wavelengths $\lambda_1$, $\lambda_2$ of the optical multiplexed signal is completed, and the other wavelengths of the optical multiplexed signal are reflected by the bandpass filter 302 and collimated to the output optical fiber 1120 of the first GRIN lens 200.

An optical signal having the wavelength $\lambda_1$ from the first adding optical fiber 6110 is transmitted to the optical crystal 400 via the second GRIN lens 500. A direction of transmission of the optical signal is refracted by the optical crystal 400, and the optical signal is collimated to the end 1131 of the optical fiber 1130 via the first GRIN lens 200. Then the optical signal is input again from the end 1132 of the optical fiber 1130, transmitted to the bandpass filter 302 via the first GRIN lens 200, and collimated to the output optical fiber 1120. At the same time, an optical signal having the wavelength $\lambda_2$ the second adding end 6130 is transmitted to the optical crystal 400 via the second GRIN lens 500. A direction of transmission of that optical signal is refracted by the optical crystal 400, and such optical signal is collimated to the output optical fiber 1120 via the first GRIN lens 200. Thus, a function of adding the two particular wavelengths $\lambda_1$, $\lambda_2$ of the optical signal is completed.

Figure 7:
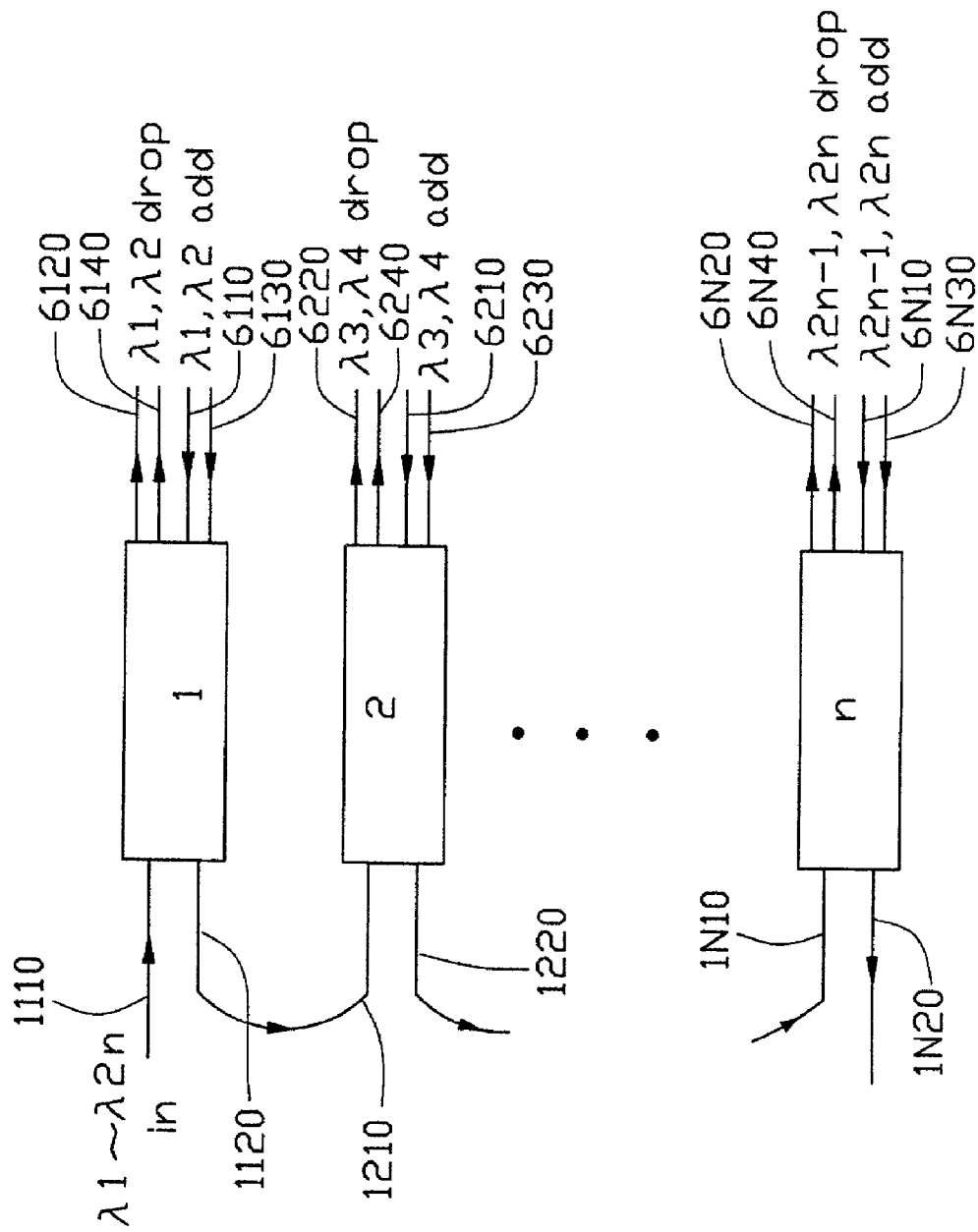
FIG. 7 is a diagram showing several optical add-drop multiplexers of the third embodiment connected in series.

FIG. 7 is a diagram showing several optical add-drop multiplexers 1" in accordance with the third embodiment of the present invention connected in series. N optical add-drop multiplexers 1" as decribed in FIG. 6 are connected in series to provide complementary adding and dropping of 2~2N channels of optical signals, with each optical add-drop multiplexer 1" having two different central wavelengths $\lambda_{2n-1}$~$\lambda_{2n}$.

In use, the input optical fiber 1110 of the first optical add-drop multiplexer and an output optical fiber 1N20 of an Nth optical add-drop multiplexer respectively act as an input end and an output end for the optical signals. An output optical fiber 1120~1(N−1)20 of each optical add-drop multiplexer connects with an input optical fiber 1210~1N10 of its adjacent optical add-drop multiplexer. Adding optical fibers 6110~6N10, 6130~6N30 and dropping optical fibers 6120~6N20, 6140~6N40 for particular wavelengths respectively add and drop $\lambda_1$~$\lambda_{2n-1}$, $\lambda_2$~$\lambda_{2n}$ of the optical multiplexed signal.

It can be appreciated that in a variation by applying/adding one additional filter onto the lens 50 facing the crystal 40, the whole system may become a symmetric arrangement and function as a mutual switch device. While preferred embodiments in accordance with the present invention have been shown and described, equivalent modifications and changes known to persons skilled in the art according to the spirit of the present invention are considered within the scope of the present invention as defined in the appended claims.

The invention claimed is:
1. An optical add-drop multiplexer comprising:
 a first ferrule having an input optical fiber, an output optical fiber and a third optical fiber stationed therein;
 a first graded index lens;
 a first bandpass filter having a first central wavelength;
 a second bandpass filter having a second central wavelength;
 an optical crystal;
 a second graded index lens; and
 a second ferrule having a first adding optical fiber and a second adding optical fiber stationed therein, and a first dropping optical fiber and a second dropping optical fiber stationed therein;
 wherein the first graded index lens, the first and second bandpass filters, the optical crystal and the second graded index lens are successively placed between the first ferrule and the second ferrule, an optical multiplexed signal from the input optical fiber is transmitted to the first bandpass filter, from which an optical signal having a wavelength identical to the first central wavelength of the first bandpass filter is output to the first dropping optical fiber, and other optical signals having other wavelengths are transmitted to the second bandpass filter via the third optical fiber, from which an optical signal having a wavelength identical to the second central wavelength of the second bandpass filter is output to the second dropping optical fiber, and other optical signals having other wavelengths are coupled with optical signals from the first and the second adding optical fibers whose wavelengths are respectively identical to the first and second central wavelengths of the first and the second bandpass filters and are transmitted to the output optical fiber.

2. The optical add-drop multiplexer as described in claim 1, wherein the first and second bandpass filters are thin-film filters.

3. The optical add-drop multiplexer as described in claim 2, wherein the first and second bandpass filters are attached on the first graded index lens.

4. The optical add-drop multiplexer as described in claim 1, wherein the first and second bandpass filters are attached on the first graded index lens.

5. The optical add-drop multiplexer as described in claim 1, wherein a profile of the optical crystal is a generally regular hexagon.

6. The optical add-drop multiplexer as described in claim 1, wherein a profile of the optical crystal is an egg-timer shaped hexagon.

7. The optical add-drop multiplexer as described in claim 1, wherein the first ferrule further defines four holes, two of the holes respectively hold the input optical fiber and the output optical fiber therein and the other two of the holes respectively hold two ends of the third optical fiber, and the second ferrule defines four holes with four optical fibers respectively inserted therein.

8. A multicenter optical add-drop multiplexer module comprising a plurality of optical add-drop multiplexers sequentially connected together from the first to the last, each optical add-drop multiplexer comprising:

a first ferrule having an input optical fiber, an output optical fiber and a third optical fiber stationed therein;

a first graded index lens;

a first bandpass filter having a first central wavelength;

a second bandpass filter having a second central wavelength;

an optical crystal;

a second graded index lens; and a second ferrule having a first adding optical fiber and a second adding optical fiber stationed therein, and a first dropping optical fiber and a second dropping optical fiber stationed therein;

wherein the first graded index lens, the first and second bandpass filters, the optical crystal and the second graded index lens are successively placed between the first ferrule and the second ferrule, an optical multiplexed signal from the input optical fiber is transmitted to the first bandpass filter, from which an optical signal having a wavelength identical to the first central wavelength of the first bandpass filter is output to the first dropping optical fiber, and other optical signals having other wavelengths are transmitted to the second bandpass filter via the third optical fiber, from which an optical signal having a wavelength identical to the second central wavelength of the second bandpass filter is output to the second dropping optical fiber, and other optical signals having other wavelengths are coupled with optical signals from the first and the second adding optical fibers whose wavelengths are respectively identical to the first and the second central wavelengths of the first and the second bandpass filters and are transmitted to the output optical fiber; and wherein the bandpass filter of each optical add-drop multiplexer has a different central wavelength, the input optical fiber of the first optical add-drop multiplexer and the output optical fiber of the last optical add-drop multiplexer respectively serve as an input end and an output end for optical signals, and the output end of each optical add-drop multiplexer connects with the input end of its adjacent optical add-drop multiplexer.

* * * * *